United States Patent [19]

Oiso et al.

[11] Patent Number: 4,467,711
[45] Date of Patent: Aug. 28, 1984

[54] METHOD AND APPARATUS FOR CRACKING NUTS

[75] Inventors: Hisayoshi Oiso, Tokyo; Norio Joyama, Kanagawa, both of Japan

[73] Assignee: Meiji Seika Kaisha Ltd., Tokyo, Japan

[21] Appl. No.: 378,352

[22] Filed: May 14, 1982

[30] Foreign Application Priority Data

May 15, 1981 [JP] Japan .................................. 56-72162

[51] Int. Cl.$^3$ ............................................... A23N 5/00
[52] U.S. Cl. ....................................... 99/577; 99/580; 99/582
[58] Field of Search ................. 99/568, 571, 572, 573, 99/577, 578, 579, 580, 581–583; 30/120.1, 120.2; 426/481, 482, 484

[56] References Cited

U.S. PATENT DOCUMENTS 797,260  8/1905  Brown ............................. 99/580 X
2,065,544 12/1936 Strong .................................. 99/582

Primary Examiner—Timothy F. Simone
Attorney, Agent, or Firm—Sughrue, Mion, Zinn, Macpeak, and Seas

[57] ABSTRACT

The nut cracking apparatus includes a conveyor comprised of a plurality of parallel slats connected to endless chains for intermittent movement from a hopper to a nut gripping and cracking apparatus. Each slat is provided with a row of openings extending therethrough for receiving nuts from the hopper and an underlying support is provided to retain the nuts in the openings until each slat is moved in sequence to a plurality of cracking apparatus. Each nut is located between an upper and lower nut gripping block each of which has a recess therein with a slot in the bottom thereof. The lower nut gripping block is spring biased on a fixed blade to normally have the blade retracted out of the recess. The upper nut gripping block is spring biased on an opposed blade which in turn is connected to the piston of an hydraulically operated piston and cylinder device. The upper nut gripping block is normally biased so that the blade is withdrawn from the recess. Upon lowering of the upper blade toward the lower blade a nut is gripped between the upper and lower blocks and continued downward movement of the blade will cause the upper and lower blades to penetrate into the recesses to cut the shell of the nut into two pieces without damaging the kernel of the nut. A blade position sensing device is provided for limiting the travel of the blade and upon cutting the shell into two pieces, the upper blade is retracted and the upper and lower nut gripping blocks are spring biased back to their normal position. Upon the next stepwise movement of the belt, the slat is moved to a position whereby the shell pieces will drop from the openings in the slat to a container.

2 Claims, 8 Drawing Figures

METHOD AND APPARATUS FOR CRACKING NUTS

BACKGROUND OF THE INVENTION

The present invention is directed to a method and apparatus for cracking nuts of the type having very hard shells such as macadamia nuts or walnuts. In the past a great deal of skill was required to crack nuts having a kernel such as macadamia nuts in a highly efficient manner without damaging the kernels.

U.S. Pat. No. 4,135,442 discloses a nut cracking machine wherein a nut is held between two dish-shaped dies. Means are provided for applying a sudden impact to one of the dies thereby causing the die to move a limited distance to crack the nut. When the nut is cracked or crushed in this manner, the shell scatters and the kernel of the nut is in danger of being damaged. The cracking machine makes it impossible to divide the shell into two pieces without damaging the kernel.

U.S. Pat. No. 4,200,042 discloses a nut cracker having first and second levers which are pivotally connected together at one end and have opposed portions provided with one or more cross-grooves for receiving nuts to be cracked. These grooves have a varying depth from one end to the other and also have a varying width thus accommodating a wide range of nut sizes. The grooves also have transverse ribs to hold the nuts in place while being cracked and in a preferred structure, the grooves are defined by straight wall segments meeting in angular relation. One of the levers may comprise a base portion and the other lever may include a handle for applying leverage. When the nuts are placed in these grooves and the levers brought together, the nuts are crushed without cutting the shell so that there is a distinct possibility that the kernels of the nuts will be damaged because of the scattering of the shell.

In the past the cracking of nuts was generally a laborious and time consuming operation even when using the apparatus disclosed in the two above-identified patents. The nuts were usually cracked one-by-one and some element of manual labor was generally required.

SUMMARY OF THE INVENTION

The present invention provides a new and improved apparatus for continuously cracking nuts by dividing the shells into two pieces without scattering of the shells and without damaging the kernels of the nuts.

The present invention provides a new and improved apparatus for cracking nuts wherein conveying means are provided for intermittently conveying a plurality of nuts simultaneously to a cracking station. The conveying means includes a plurality of transverse slats connected between two conveyor chains with each slat having a plurality of cylindrical openings therethrough each of which is adapted to receive a nut for movement along a supporting surface. The cracking station includes a plurality of pairs of opposed blocks having nut engaging cavities in the opposed surfaces thereof. Means are provided for moving each upper block toward each lower block to grip a nut between the opposed cavities. Upper and lower blades are guided for movement through slots in each block whereby the blades may protrude into the cavities in the blocks. Means are provided for lowering the upper blade which upon engagement with the nut held between the upper and lower blocks will push the lower block downwardly against a spring thereby allowing the lower blade to project upwardly into the cavity in the lower block thereby cutting the nut by means of the upper blade and the lower blade. The upper and lower blocks and the upper blade are movable through a distance such that only the shell of each nut will be cut without inflicting any damage to the kernels of the nut.

The present invention provides a new and improved method for cracking nuts comprising the steps of supplying a nut to a space defined between two cavities in upper and lower opposed blocks, lowering the upper block to hold the nut between the opposed blocks, lowering an upper blade through a recess in the upper block into engagement with the nut along the center line of the cavity in the upper block thereby pushing the lower block downwardly by means of the force exerted thereon through the nut held between the upper and lower blocks whereby a fixed lower blade will protrude through a recess formed along the center line of the cavity of the lower block, cutting the nut with the upper and lower blades at the same time until the blades are a specified distance apart and returning the upper and lower blocks and the upper blade to its original position to permit removal of the nut.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
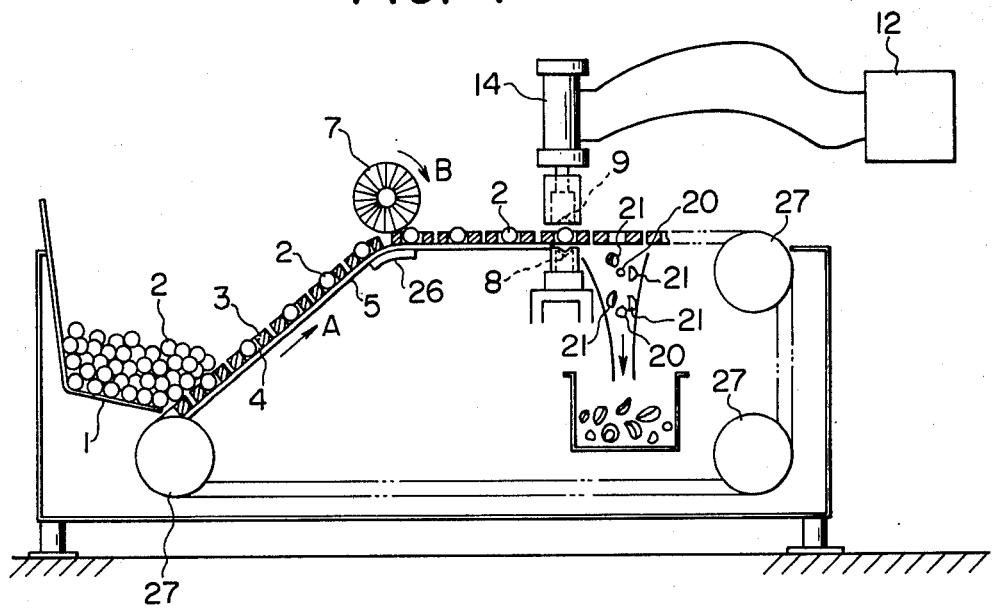
FIG. 1 is a schematic side elevation view of the apparatus according to the present invention.
Figure 2:
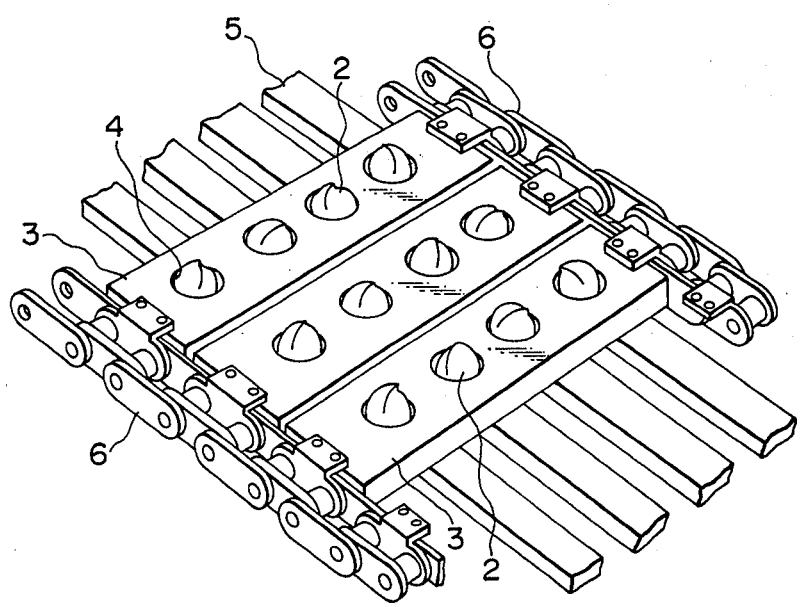
FIG. 2 is a top perspective view of a portion of the nut conveying means.

The nut cracking machine as shown in FIG. 1 includes a hopper 1 adapted to hold a plurality of nuts 2. An endless slat conveyor 3 is guided for movement about a plurality of guide rollers 27 and a guide plate 26. The upwardly moving reach of the conveyor belt forms one wall of the hopper 1. The slat conveyor 3 is comprised of a plurality of slats connected transversely between two endless chains 6 with each slat having a plurality of cylindrical openings 4 extending therethrough in a row transverse to the direction of movement of the conveyor. Thus, as the conveyor 3 moves upwardly in the direction of the arrow A as shown in FIG. 1, a nut 2 will be located in each cylindrical opening 4 and supported therein by means of a plurality of elongated flat guide plates 5 positioned beneath the conveyor from the hopper 1 to the nut cracking apparatus. The conveyor 3 is driven intermittently by suitable driving means (not shown). Should additional nuts be conveyed upwardly by the conveyor other than those located in the openings 4 a brush 7 is mounted for rotation in the direction of the arrow B opposite the guide plate 26 for returning the excess nuts to the hopper 1.

A plurality of nut cracking bodies comprised of upper and lower blocks, upper and lower blades and hydraulic actuating means are disposed in a row parallel to the slats 3. The number of nut cracking assemblies is equal to the number of openings 4 in the slats 3.

Figure 3:
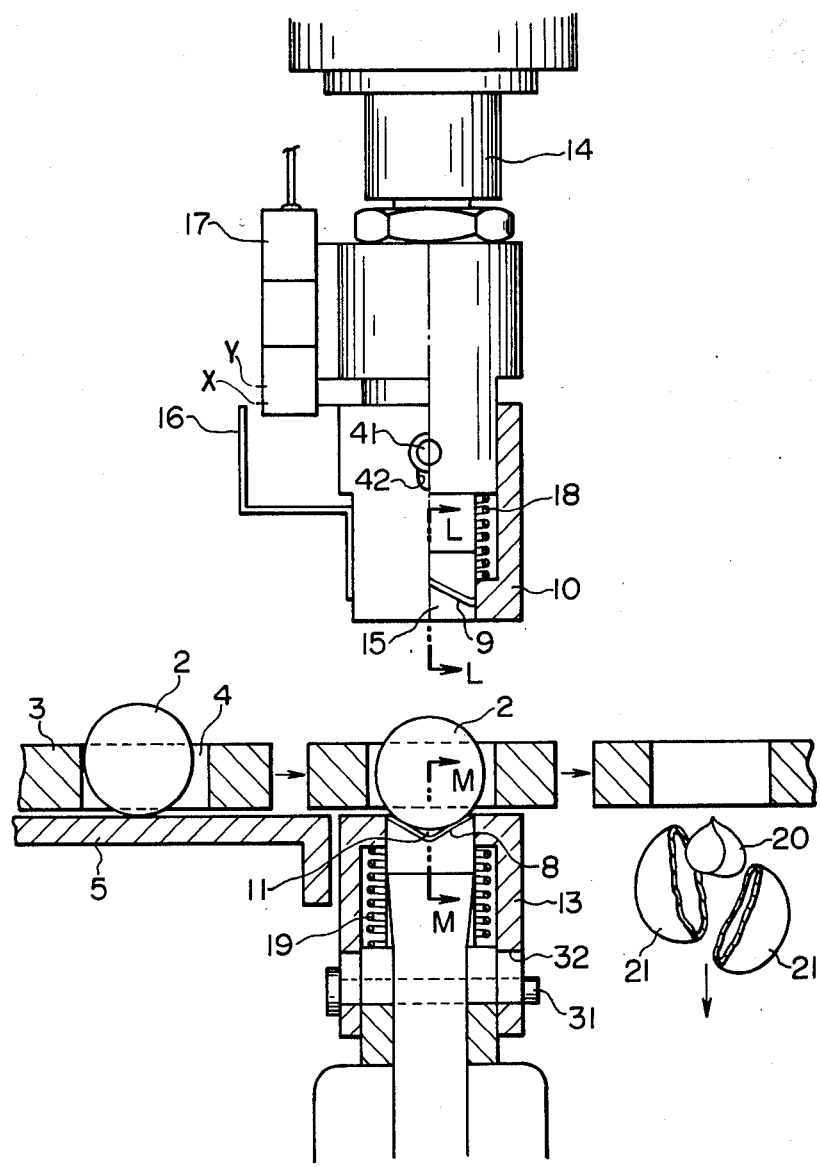
FIG. 3 is a longitudinal sectional view of the nut cracking apparatus with the parts positioned for receiving a nut.

As best seen in FIG. 3, the nuts 2 are carried along the upper surface of the guide plates 5 by means of the slats 3 until the nuts reach the lower blocks 13 of the nut cracking apparatus. Each lower block 13 is normally biased upwardly by means of a spring 19. The upper surface of each lower block 13 is provided with a cavity 11 in the upper surface thereof having a slot extending therethrough in the direction of movement of the conveyor. A lower blade 8 is secured in a fixed position to each apparatus and extends upwardly through each slot in each cavity 11. The lower block 13 is normally biased upwardly to the position shown in FIG. 3 by the spring 19 and the upward movement thereof is limited by the engagement of the pin 31 in the slot 32 in the block 13. With the block in the position shown in FIG. 3 the lower blade 8 is recessed within the slot formed in the cavity 11.

When a slat 3 is moved into position over the lower blocks 13 with the openings 4 in alignment with the cavities 11, a suitable detector such as a phototube, or a microswitch (not shown) initiates the operation of an oil pressure pump 12 which supplies oil under pressure to each cylinder 14 to move the associated upper block and blade assembly downwardly as shown in FIG. 1. Each upper block and blade assembly is comprised of an upper block 10 having a cavity 15 in the lower recess thereof adapted to engage a nut 2. The upper block 10 is biased in the downward direction by a spring 18 relative to the piston member 14. The block 10 is mounted for limited movement relative to the piston 14 by means of a pin 41 and slot 42 similar to the pin and slot arrangement for the lower block. A blade 9 is secured to each piston 14 for movement therewith and is adapted to protrude downwardly through an elongated slot in each cavity 15. Normally, when the piston 14 is in the raised position as shown in FIG. 3, the block 10 is biased downwardly by the spring 18 to the limit permitted by the pin and slot connection 41 and 42 so that the blade 9 will not be protruding into the cavity 15.

Figure 4:
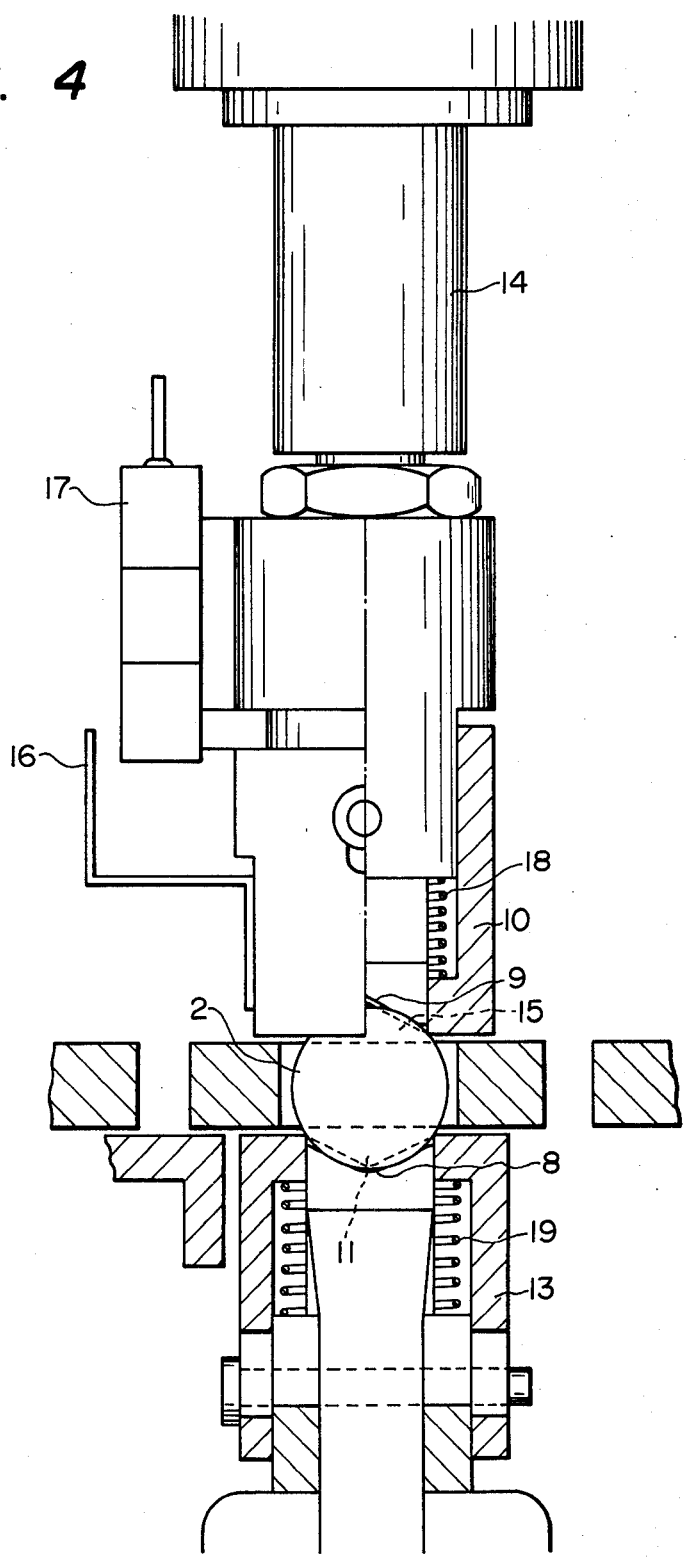
FIG. 4 is a longitudinal sectional view of the apparatus shown in FIG. 3 with the parts in the nut cracking position.

As mentioned previously, when one of the slats 3 is in position so as to place a row of nuts 2 in the appropriate lower recesses 11 formed in the lower blocks 13, an oil pump switch is energized to initiate the operation of each cylinder to extend the piston 14 thereof downwardly as viewed in FIG. 3. The downward movement of each piston 14 will bring the upper block 10 with the cavity 15 into engagement with a nut so that a nut will be held between each pair of upper and lower blocks. Further downward movement of the piston 14 will cause the lower block 13 to move downwardly against the force of the spring 19 due to the downward pressure exerted on the nut 2. The lower blade 8 will then penetrate upwardly through the slot in the cavity 11 so as to engage the nut 2. The pressing of the nut 2 by the upper blade 9 is continued so that the upper blade 9 and the fixed lower blade 8 penetrate into the shell of the nut by a distance equal to the thickness of the shell. Thus, the nut shell will be divided into two pieces without damaging the kernal of the nut. The cutting distance of the blades relative to the nut 2 corresponds to the distance between the nondetecting position X of the switch 17 corresponding to the tip end of the metal detection strip 16 provided on the side wall of the upper block 10 at a point where the downward movement of the upper block 10 is stopped as shown in FIG. 4 and the detecting position Y of the switch 17 corresponding to the tip end of the metal detection strip 16 provided on the side wall of the upper block corresponding to the dead point where the downward movement of the upper blade 9 is stopped as shown in FIG. 4. When the tip end of the metal detection strip 16 reaches the detecting position Y of the switch 17, the flow of oil in the cylinder 14 is reversed to raise the upper block 10 and the upper blade 9 to their original positions as shown in FIG. 3. When the blade 9 moves upwardly, the upper block 10 initially moves downwardly under the force of the spring 18 to the limit determined by the pin and slot connection 41 and 42 and subsequently the blade 9 and block 10 will move upwardly together. Simultaneously, the lower block 13 is moved upwardly by the spring 19 so that the lower blade 8 will be effectively retracted from the cavity 11. As soon as the upper block 10 and the lower block 13 of each apparatus return to their original positions, the slat conveyor 3 accommodating the cracked nuts is conveyed intermittently for a specific distance so that the kernel 20 and the divided shells 21 drop downwardly from the cylindrical openings in the slat 3 as shown in FIGS. 1 and 3.

Figure 5:
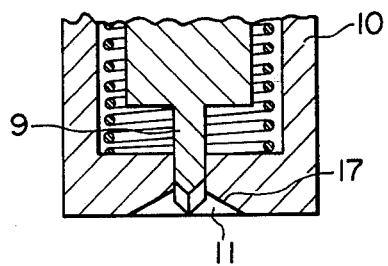
FIG. 5 is a sectional view taken along the line L—L in FIG. 3.
Figure 6:
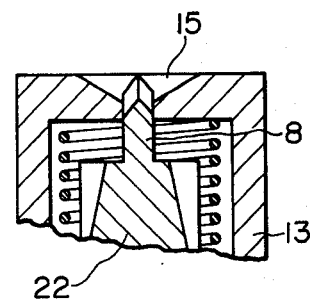
FIG. 6 is a sectional view taken along the line M—M in FIG. 3.
Figure 7:
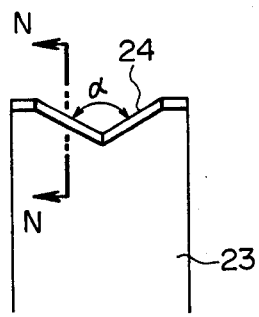
FIG. 7 is a front elevation view of a lower blade according to the present invention.
Figure 8:
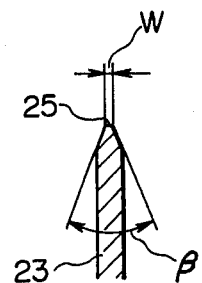
FIG. 8 is a sectional view taken along the line N—N in FIG. 7.

The upper block 10 and the upper blade 9 are shown in detail in FIG. 5 and the details of the lower block 13 and the lower blade 8 are shown in FIG. 6. The base portion 22 of the fixed blade 8 is provided with tapered sides as shown in FIG. 6 to facilitate the downward removal of any finely divided pieces of shell. Both the upper blade 9 and the lower blade 8 have a V-shaped notch 24 in the upper edge thereof defined by the angle $\alpha$ as shown in FIG. 7. The angle $\alpha$ should be chosen from the range between 120° and 160° in order to assure the proper cracking of the shell into two pieces. As shown in FIG. 8 the cutting edge of the blade is beveled on opposite sides of the blade with the beveled surfaces being separated by an angle $\beta$ which is approximately 80°. When the angle $\beta$ is less than 80° the blade is easily broken by repeated cracking of nuts and the cutting edge of the blade enters into the shell without separating the shell into two pieces. This frequently leads to damage of the kernel. Furthermore, if the angle $\beta$ is greater than 80° the shell is not properly divided into two pieces. If a pressure higher than that required is applied in order to crack the shell, the entire shell tends to be crushed and scattered and the kernel damaged. Accordingly, it is necessary to maintain the angle $\beta$ at approximately 80°. As best seen in FIG. 8, the upper edge 25 of the blade 24 should be cut to define a flat portion having a width W which will prevent abrasion of the edge. If the width W of the flat part is less than 0.5 mm the upper edge 25 is easily worn away. If the width W is longer than 0.5 mm, the cracking requires a much higher pressure which is apt to shatter the shell with the possibility of damage to the kernel. Accordingly, the upper edge 25 of the blade 24 is cut flat and is provided with a width of approximately 0.5 mm.

When the nuts such as walnuts or macadamia nuts are cracked by the process according to the present invention the shells can easily be divided into two pieces automatically and continuously without crushing and scattering the shell. Furthermore, the shells and kernel can be taken out without damage and the kernels can be easily separated from the shells. In the case of nuts having an even surface such as macadamia nuts, the shells can be divided equally in halves because the upper blades and the lower blades are disposed opposite each other in the same planes which in turn is coincident with the center of the nut.

While the invention has been particularly shown and described with reference to a preferred embodiment thereof, it will be understood by those in the art that various changes in form and details may be made therein without departing from the spirit and scope of the invention.

What is claimed is:

1. A nut cracking apparatus comprising a lower nut gripping means and an upper nut gripping means disposed in vertical alignment with each other and moveable toward and away from said nut for gripping and releasing said nut, a lower fixed blade means and an upper moveable blade means being disposed in vertical alignment with each other and moveable relative to each other through said gripping means for cutting the shell of the nut on opposite sides thereof, actuating means for moving said upper gripping means and said upper blade means in opposite directions relative to the lower gripping means and lower fixed blade means and conveying means for automatically positioning a nut between said gripping means and removing the nut subsequent to cracking, said lower nut gripping means being comprised of a first block having a nut receiving recess in one surface thereof with a slot in said recess for allowing penetration of said lower fixed blade means into said recess, spring means normally biasing said first block relative to said lower fixed blade means so that said lower fixed blade means will not extend into said recess, said upper blade means being connected to said actuating means and said upper gripping means comprising a second block having a nut receiving recess therein with a slot in the recess for permitting penetration of said upper blade means into said recess, spring means normally biasing said second block relative to said upper blade means so that said upper blade means will not extend into said recess, means for operating said actuating means for gripping a nut between said first and second blocks and causing penetration of said upper and lower blade means into said recesses to cut said shell of said nut into two pieces.

2. The nut cracking apparatus as set forth in claim 1 wherein said conveying means is comprised of a hopper, an endless conveyor comprising of a plurality of parallel slats movable upwardly relative to said hopper and defining one wall thereof, each of said slats having a row of openings extending therethrough for receiving nuts therein, means for supporting said nuts in said openings as each slat moves from said hopper to said nut gripping means to allow said nut gripping means to grip a nut while still located in said opening.

* * * * *